(«12») United States Patent
Suess

(10) Patent No.: US 9,108,661 B2
(45) Date of Patent: Aug. 18, 2015

(54) TRANSPORT CART THAT CAN BE STORED IN A SPACE-SAVING MANNER FOR EQUIPPING AN AIRCRAFT GALLEY

(75) Inventor: Wolfgang Suess, Hamburg (DE)

(73) Assignee: Airbus Operations GmbH (DE)

( * ) Notice: Subject to any disclaimer, the term of this patent is extended or adjusted under 35 U.S.C. 154(b) by 414 days.

(21) Appl. No.: 13/262,402

(22) PCT Filed: Mar. 17, 2010

(86) PCT No.: PCT/EP2010/001689
§ 371 (c)(1),
(2), (4) Date: Apr. 17, 2012

(87) PCT Pub. No.: WO2010/112142
PCT Pub. Date: Oct. 7, 2010

(65) Prior Publication Data
US 2012/0194050 A1     Aug. 2, 2012

Related U.S. Application Data

(60) Provisional application No. 61/211,713, filed on Apr. 2, 2009.

(30) Foreign Application Priority Data

Apr. 2, 2009   (DE) .................... 20 2009 004 554 U

(51) Int. Cl.
*B62B 3/16*      (2006.01)
*B62B 3/02*      (2006.01)
*B62B 5/04*      (2006.01)

(52) U.S. Cl.
CPC ... *B62B 3/16* (2013.01); *B62B 3/02* (2013.01); *B62B 5/0433* (2013.01); *B62B 2202/67* (2013.01); *B62B 2203/74* (2013.01)

(58) Field of Classification Search
CPC ........ B62B 3/002; B62B 3/006; B62B 3/007; B62B 3/02; B62B 3/04; B62B 3/10; B62B 3/14; B62B 3/1404; B62B 3/16; B62B 5/0003
USPC .............. 280/47.34, 47.35, 79.11, 79.2, 79.3, 280/33.998
See application file for complete search history.

(56) References Cited

U.S. PATENT DOCUMENTS 2,831,698 A * 4/1958 Mills .......................... 280/47.35
2,862,720 A   12/1958 Stone et al.
(Continued)

FOREIGN PATENT DOCUMENTS

| | | |
|---|---|---|
| JP | 50030408 U | 4/1975 |
| JP | 56033760 U | 4/1981 |
| WO | 2007028958 A1 | 3/2007 |

OTHER PUBLICATIONS

Search Report and Written Opinion for International Patent Application No. PCT/EP2010/001689; Jun. 25, 2010.

*Primary Examiner* — Frank Vanaman
(74) *Attorney, Agent, or Firm* — Barnes & Thornburg LLP

(57) ABSTRACT

An equipping system is provided for equipping an aircraft galley. The equipping system includes a box, which is accommodatable in the aircraft galley to be equipped, as well as a transport cart for equipping the aircraft galley. The system includes a base element, which has a bottom surface and a loading surface opposite of the bottom surface, a plurality of wheels fastened to the bottom surface of the base element, a handle attached to the base element, and a securing mechanism adapted to prevent the box from sliding off the transport cart while it is being transported on the transport cart. The handle is shaped and attached in such a position to the base element that the base element of the transport cart, in the unloaded state of the transport cart, is stackable onto a base element of a further transport cart.

18 Claims, 5 Drawing Sheets

(56) References Cited

U.S. PATENT DOCUMENTS

| | | | |
|---|---|---|---|
| D185,058 S * | 5/1959 | Ball | D34/18 |
| 2,957,186 A * | 10/1960 | Williamson et al. | 5/101 |
| 3,366,396 A * | 1/1968 | Hardy | 280/32.5 |
| 3,877,744 A * | 4/1975 | Miller | 296/22 |
| 4,220,343 A * | 9/1980 | Robinson | 280/33.998 |
| 4,231,695 A * | 11/1980 | Weston, Sr. | 410/69 |
| 4,274,644 A * | 6/1981 | Taylor | 280/39 |
| 4,670,227 A * | 6/1987 | Smith | 422/297 |
| 5,299,816 A * | 4/1994 | Vom Braucke et al. | 280/33.998 |
| 5,465,660 A * | 11/1995 | Conti et al. | 100/48 |
| 5,484,046 A | 1/1996 | Alper et al. | |
| 5,503,424 A * | 4/1996 | Agopian | 280/651 |
| 5,683,220 A | 11/1997 | Oh et al. | |
| 6,185,917 B1 * | 2/2001 | Goudes | 56/12.8 |
| 6,223,691 B1 * | 5/2001 | Beattie | 119/453 |
| 2009/0026721 A1 * | 1/2009 | Martinez | 280/79.5 |

* cited by examiner

TRANSPORT CART THAT CAN BE STORED IN A SPACE-SAVING MANNER FOR EQUIPPING AN AIRCRAFT GALLEY

CROSS-REFERENCE TO RELATED APPLICATIONS

This application is the U.S. national phase of PCT/EP2010/001689 filed Mar. 17, 2010. PCT/EP2010/001689 claims the benefit under the Convention of German Patent Application No. 20 2009 004 554.4 and U.S. Provisional Patent Application No. 61/211,713 both filed on Apr. 2, 2009.

FIELD OF THE INVENTION

The present invention relates to a transport cart storable in a space-saving manner for equipping an aircraft galley, for example with service products needed for catering to the passengers on board the aircraft.

BACKGROUND

Currently it is customary to load some of the service products needed for catering to the passengers on board an aircraft, such as for example food or drinks, into trolleys. Loading of the trolleys is effected by a catering company responsible for supplying the service products. The loaded trolleys are brought on board the aircraft and accommodated in appropriate trolley receiving areas in the galleys of the aircraft. While the aircraft is flying, some of the trolleys accommodated in the trolley receiving areas in the galleys are used for service tasks, i.e. to distribute food and drinks to the passengers in the passenger cabin. The other trolleys however remain throughout the flight in the trolley receiving areas in the galleys. Because of their being equipped with a stable, shock-proof housing, wheels, brakes etc., trolleys have a relatively large volume and a relatively high weight. The trolleys that are not used for service purposes therefore in particular lead to an increased spatial requirement as well as extra weight in the galleys of the aircraft.

The catering company responsible for supplying the service products brings service products, which are not to be loaded into trolleys, by means of a transport cart onto the aircraft, where they are stowed manually into cabinets provided in the galleys. The transport cart, after it has been unloaded, is removed from the aircraft. Manually filling the galley cabinets is relatively time-consuming. Filling the top galley cabinets in particular, i.e. cabinets that are disposed in an upper portion of the galleys, moreover entails a relatively high amount of effort.

From WO 2007/096000 A1 an aircraft galley of a modular construction is known, which comprises a basic body having a plurality of compartments. Accommodated in the compartments are boxes of various sizes, in which service products needed for catering to the passengers on board the aircraft, such as for example food or drinks, may be accommodated. Furthermore, in the compartments of the basic body various units, such as for example an oven or a microwave oven, are disposed.

The non-prior publication DE 10 2008 063 248 describes a transport cart that is suitable for equipping an aircraft galley of a modular construction, which is known from WO 2007/096000 A1, with boxes containing for example service products that are needed for catering to the passengers on board the aircraft. The transport cart comprises a base element for example of a plate-shaped configuration, to which a plurality of wheels as well as frame elements disposed at a distance from one another are fastened. The transport cart further comprises a first guide device that is devised to come into engagement with a complementary second guide device that is formed on a box, which may be received in the aircraft galley to be equipped and is provided for transport in the transport cart. The first guide is devised, when it is situated in engagement with the complementary second guide device formed on the box, to secure the box against displacement on the transport cart in a direction at right angles to a longitudinal axis of the transport cart. Finally, the transport cart is provided with a locking mechanism that is devised to secure the box against displacement on the transport cart in a direction parallel to a longitudinal axis of the transport cart. The transport cart described in DE 10 2008 063 248 has the drawback that it is relatively bulky and therefore, when not in use, takes up a great deal of storage space.

SUMMARY

The underlying object of the invention is to provide a transport cart that can be stored in a space-saving manner, enables easy, safe and convenient equipping of an aircraft galley, for example with service products needed for catering to the passengers on board the aircraft, and in particular is suitable for equipping an aircraft galley of a modular construction such as is known from WO 2007/096000 A1.

A transport cart according to the invention for equipping an aircraft galley comprises a base element for example of a substantially plate-shaped configuration, which has a bottom surface as well as a loading surface opposite of the bottom surface. A plurality of wheels are fastened to the bottom surface of the base element. A handle is moreover attached to the base element. The transport cart according to the invention further comprises a securing mechanism that is adapted to secure a box, which is accommodatable in the aircraft galley to be equipped, while it is being transported on the transport cart to prevent it from slipping off the transport cart. In other words, the securing mechanism is used, for example when the transport cart is being moved in the direction of a longitudinal axis of the transport cart, to prevent the box from unintentionally shifting in the direction of the longitudinal axis of the transport cart and falling off the transport cart. Here, by the longitudinal axis of the transport cart is meant an axis that is aligned in the normal direction of travel of the transport cart. The securing mechanism may be configured for example in the form of a locking mechanism. As the transport cart according to the invention is provided with a securing mechanism, it is possible to dispense with providing the transport cart with a closed receiving container or the like. As a result, the transport cart may be of a relatively lightweight design.

The handle of the transport cart according to the invention is so shaped and attached to the base element in such a position that, in the unloaded state of the transport cart, the base element of the transport cart is stackable onto a base element of a further transport cart according to the invention. In other words, the handle of the transport cart according to the invention is so shaped and attached to the base element in such a position that it does not impede the depositing of the base element of the transport cart according to the invention onto the base element of the further transport cart according to the invention. With the aid of the transport cart according to the invention an aircraft galley may be equipped easily, conveniently and safely with boxes that contain for example service products needed for catering to the passengers on board the aircraft. When, on the other hand, the transport cart is not in use, it may be stored in a space-saving manner because a plurality of transport carts according to the invention may be stacked one on top of the other by placing the base element of one transport cart onto the base element of a further transport cart.

The handle of the transport cart according to the invention preferably comprises a first strut, which extends from a first lateral surface of the base element. The handle may further comprise a second strut, which extends from a second lateral surface of the base element which is disposed opposite to the first lateral surface of the base element. The first and/or the second lateral surface of the base element may be aligned substantially at right angles to the loading surface of the base element. In principle, the lateral surfaces of the base element may be formed merely by the lateral surfaces of a plate-shaped base element. Where desired or necessary, however, the lateral surfaces of the base element may also be of a wall-shaped configuration, i.e. may extend from the bottom surface and/or the loading surface of the base element in a direction at right angles to the bottom surface and/or the loading surface of the base element. Such an arrangement may for example facilitate the fastening of the handle to the base element and/or secure a box disposed on the transport cart against displacement in a direction at right angles to the longitudinal axis of the transport cart.

The first and/or the second strut of the handle may extend from the lateral surfaces of the base element at an angle of ca. 35° to ca. 80° relative to the loading surface of the base element. Specially preferred is an angular range of ca. 40° to ca. 60° and particularly preferred is an angular range of ca. 45° to ca. 55°. Furthermore, the first and/or the second strut is/are fastened, in relation to the longitudinal axis of the transport cart, preferably in a central region of the base element to the base element. Such a configuration and arrangement of the handle struts allows a plurality of transport carts according to the invention to be stacked one on top of the other without difficulty.

The handle of the transport cart according to the invention may further comprise a substantially U-shaped connection element. The U-shaped connection element may be connected to the free ends of the first and second struts that extend from the lateral surfaces of the base element, i.e. may connect the free ends of the first and second struts to one another. In the region of the connection element the handle of the transport cart according to the invention may be gripped in a particularly comfortable manner for pulling or pushing the transport cart.

The handle of the transport cart according to the invention may be of a multi-piece construction. In particular, the first and the second strut as well as the connection element may be constructed separately from one another. Preferably, however, the transport cart according to the invention is provided with a handle of an integral construction. The handle may be removably attached to the base element. Where desired or necessary, the handle may then be separated from the base element in order for example to store the handle and the other components of the transport cart separately from one another. A detachable fastening of the handle to the base element moreover allows the transport cart according to the invention to be equipped with different handles. The transport cart according to the invention may then be adapted particularly well and in a particularly flexible manner to specific user requirements.

The transport cart according to the invention preferably further comprises a first guide device, which is adapted to come into engagement with a complementary second guide device that is formed on the box, which is accommodatable in the aircraft galley to be equipped and is provided for transport on the transport cart. The first guide device may be adapted, when it is situated in engagement with the complementary second guide device formed on the box, to secure the box against displacement on the transport cart in a direction at right angles to the longitudinal axis of the transport cart. The first guide device in interaction with the complementary second guide device formed on the box therefore ensures that a box being transported on the transport cart is not displaced in an undesirable manner on the transport cart for example when the transport cart is travelling over uneven ground.

The first guide device may for example comprise a rail that is provided for interacting with a component, configured in a complementary manner to the shape of the rail, of the second guide device formed on the box. As an alternative thereto, the second guide device formed on the box may comprise a rail that is devised to interact with a component of the first guide device that is configured in a complementary manner to the shape of the rail. A particularly secure connection of the first guide device to the second guide device may be guaranteed if the first guide device and the complementary second guide device formed on the box form a tongue-and-groove joint. For example, the first guide device may comprise a projection that is shaped in such a way that it is capable of being received in a groove of the second guide device formed on the box. As an alternative thereto, the second guide device formed on the box may comprise a projection that is shaped in such a way that it is capable of being received in a groove of the first guide device of the transport cart.

The loading surface of the base element and/or the first guide device is/are preferably disposed in a position on the transport cart that is adapted in such a way to a position of an arrangement in the aircraft galley for receiving a box provided for transport on the transport cart that a box accommodated on the transport cart may be loaded from the transport cart into the aircraft galley substantially by virtue of a horizontal displacement. For example the loading surface of the base element may be disposed at a height that corresponds to the height of a bottom panel of a compartment of the aircraft galley that is disposed in a lower portion of the aircraft galley. A box accommodated on the loading surface of the base element may then be comfortably pushed off the transport cart into the compartment of the aircraft galley without there being any need to lift or lower the box.

In a similar manner the first guide device of the transport cart may be disposed at a height that corresponds to the height of a guide device of the aircraft galley that, just like the first guide device of the transport cart, may be brought into engagement with a second guide device formed on a box. A box, which is held on the transport cart by virtue of the interacting of the first guide device of the transport cart with the second guide device formed on the box, may then be conveniently pushed off the transport cart into the aircraft galley, the second guide device formed on the box coming into engagement with the guide device of the aircraft galley.

The loading surface of the base element may comprise a raised step, on the surface of which the first guide device may be disposed. By means of the configuration of the step the height, at which the box is disposed during transport on the transport cart according to the invention, may be adjusted in a desired manner and adapted for example to the height of an arrangement for receiving the box in the aircraft galley.

In the region of the loading surface of the base element a plurality of rollers are preferably disposed. This allows a large, heavy box or some other large, heavy article to be loaded onto the base element of the transport cart and unloaded from the base element of the transport cart in a particularly easy and convenient manner.

The rollers may for example be fastened rotatably to lateral surfaces of the step formed in the region of the loading surface of the base element. The rollers are then easily accessible and, if need be, may be exchanged rapidly and easily in the course of maintenance work.

The transport cart according to the invention preferably further comprises a blocking device for blocking the wheels of the transport cart. The blocking device may comprise a plurality of actuating arrangements. For example, the first actuating arrangement may be disposed in the region of the first end of the transport cart, while a second actuating arrangement is situated in the region of a second, opposite end to the first end of the transport cart. The blocking device may then be actuated particularly conveniently from various sides of the transport cart.

The transport cart according to the invention may further comprise a positioning device, which is adapted to interact with a complementary positioning device provided on the galley to be equipped in order to position the transport cart relative to the aircraft galley to be equipped. By means of the positioning device it may be guaranteed that the transport cart during operation is disposed in a position relative to the aircraft galley, in which particularly easy loading and unloading of the transport cart and/or particularly easy removal of elements from the aircraft galley as well as particularly easy equipping of the aircraft galley is possible.

The positioning device may be fastened to the base element of the transport cart. The positioning device may further be provided with a recess that is adapted, once the transport cart has reached a desired position relative to the aircraft galley to be equipped, to receive a projection of the complementary positioning device provided on the aircraft galley to be equipped. As an alternative thereto, the positioning device of the transport cart may comprise a projection that is provided for being received in a recess of the complementary positioning device provided at the aircraft galley to be equipped.

The width of the transport cart and in particular the width of the base element, i.e. the distance apart of the mutually opposite lateral surfaces of the base element, is preferably adapted to the configuration of the aircraft galley to be equipped and/or to the configuration of the box that is accommodatable in the aircraft galley and is provided for transport on the transport cart. In particular, the width of the base element may correspond substantially to the width of compartments provided in the aircraft galley. The total width of the transport cart is however preferably smaller than the width of an aisle of an aircraft, in which the aircraft galley to be equipped is disposed. The transport cart may then be moved comfortably along the aisle of the aircraft.

BRIEF DESCRIPTION OF THE DRAWINGS

A preferred embodiment of a transport cart according to the invention for equipping an aircraft galley is now described in detail with reference to the accompanying diagrammatic drawings, in which.

DETAILED DESCRIPTION OF THE DRAWINGS

Figure 1:
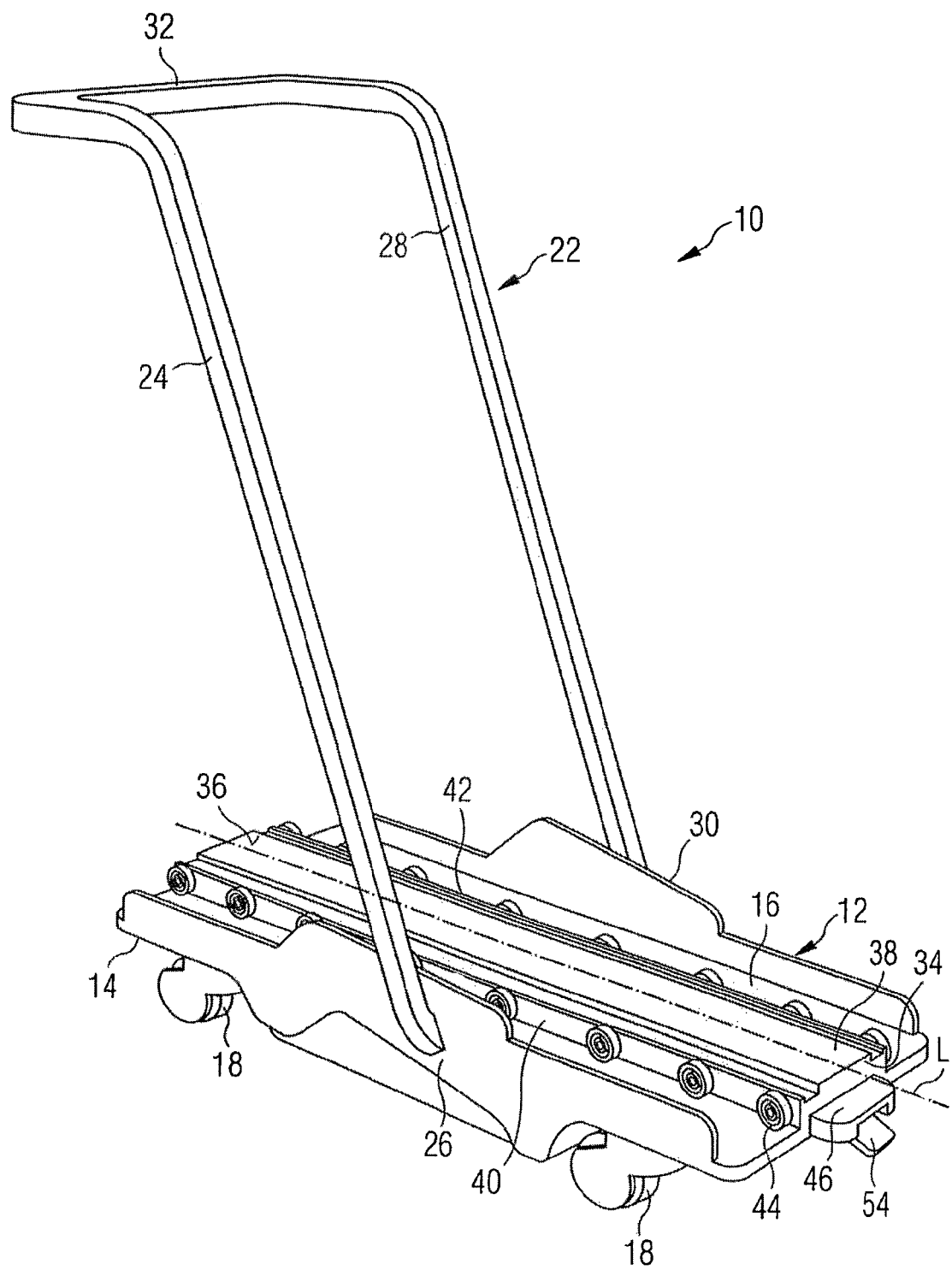
FIG. 1 shows a first three-dimensional view of a transport cart for equipping an aircraft galley in the unloaded state.

A transport cart 10 represented in FIGS. 1 to 5 comprises a base element 12 of a substantially rectangular basic shape, which has a bottom surface 14 as well as a loading surface 16 opposite of the bottom surface 14. Four wheels 18 are fastened to the bottom surface 14 of the base element 12 at a distance from longitudinal edges of the base element 12.

Figure 3:
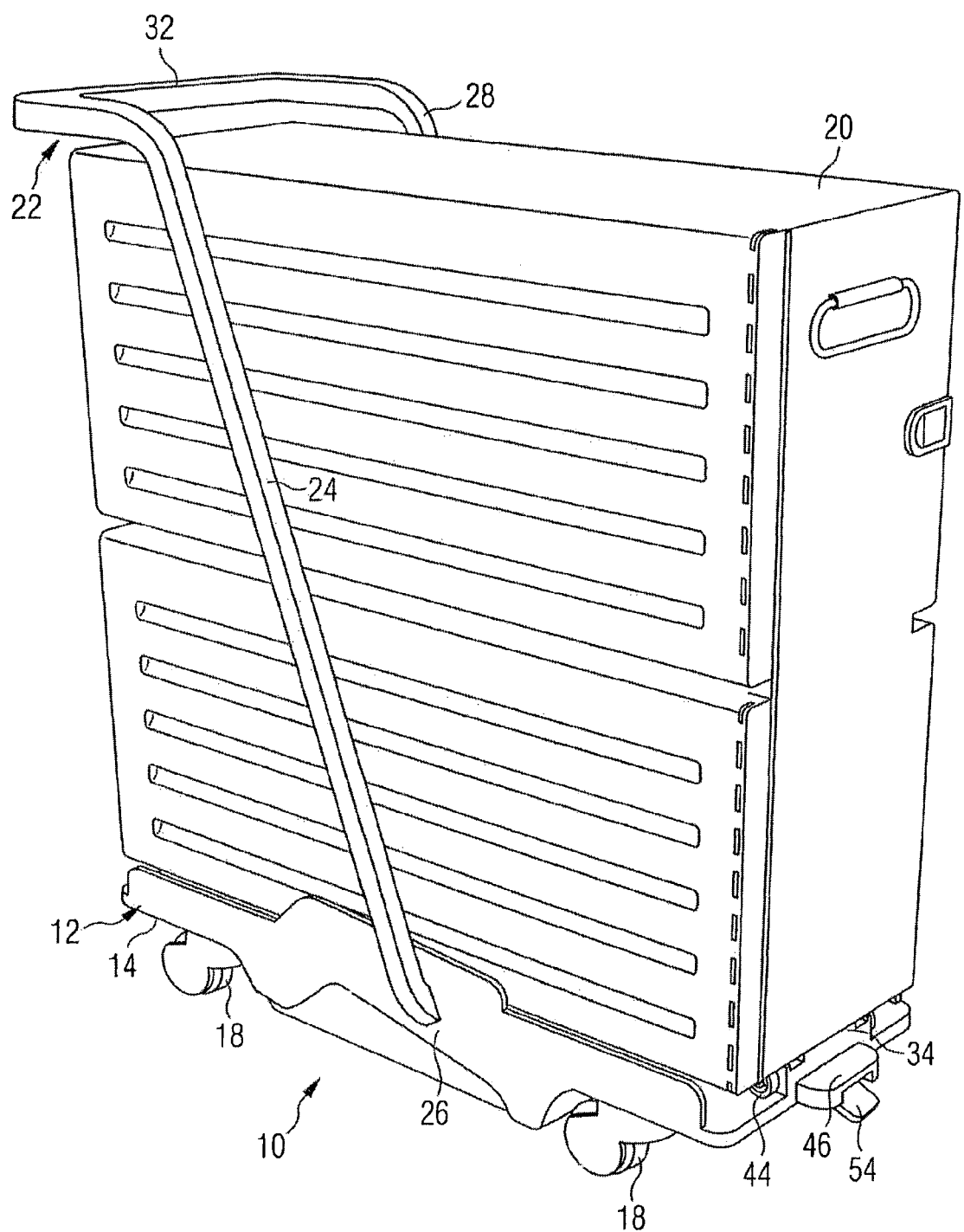
FIG. 3 shows a first three-dimensional view of the transport cart according to FIG. 1 in the state of being loaded with a box provided for equipping an aircraft galley.
Figure 4:
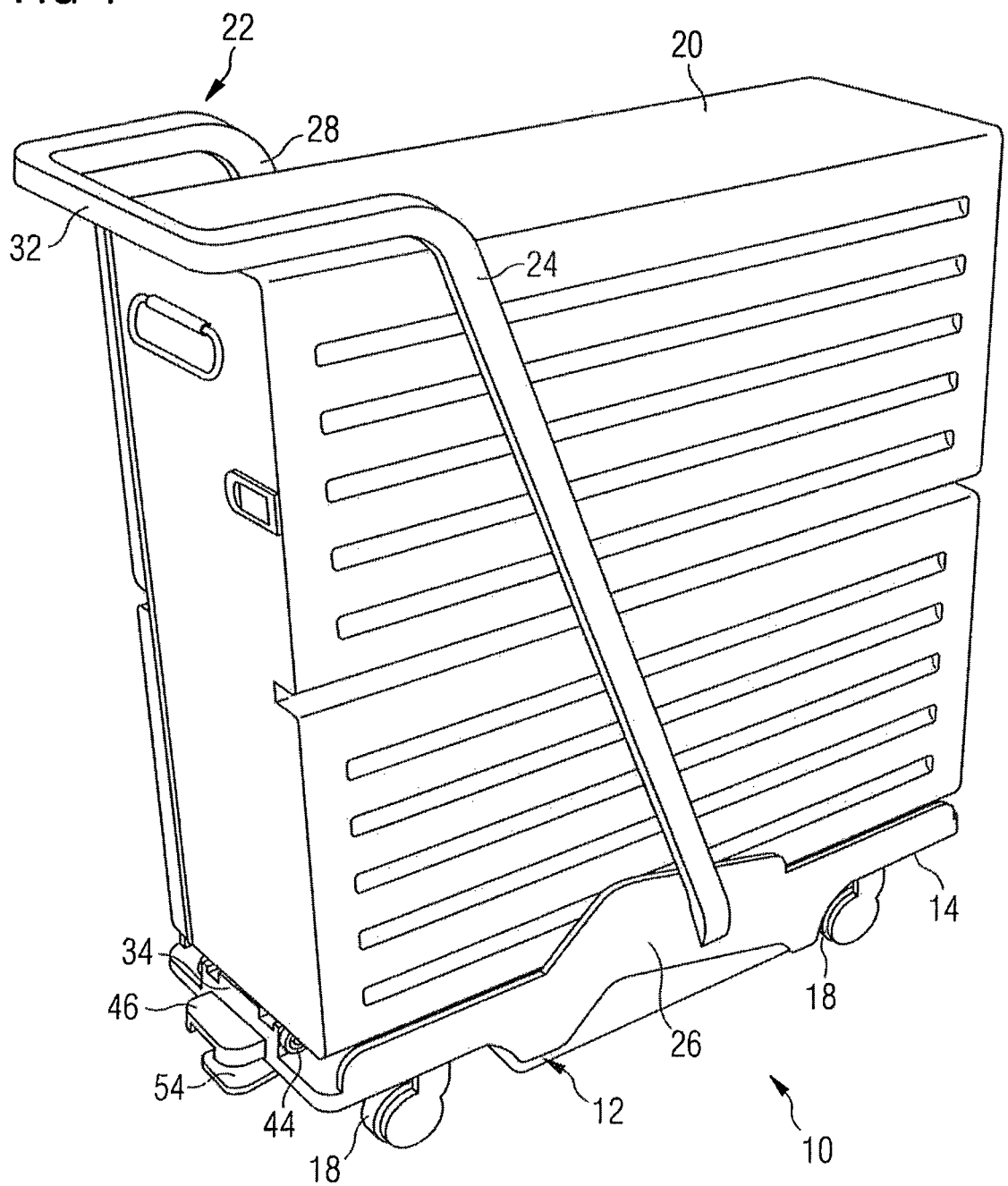
FIG. 4 shows a second three-dimensional view of the transport cart according to FIG. 3

As is evident in particular from FIGS. 3 and 4, a box 20, which is provided for equipping an aircraft galley and may contain for example service products needed for catering to passengers on board an aircraft, may be transported on the loading surface 16 of the base element 12. In order to prevent the box 20, while it is being transported on the transport cart 10, from sliding off the loading surface 16 of the transport cart 10, the transport cart 10 comprises a securing mechanism configured in the form of a locking mechanism, which is not represented in detail in the figures. The securing mechanism comprises a locking pin, which may be received in a recess formed on the box 20 once the box 20 is situated in a desired position on the loading surface 16 of the transport cart 10. The securing mechanism is used, for example while the transport cart 10 is being moved in the direction of a longitudinal axis L of the transport cart 10, to prevent the box 20 from unintentionally being displaced on the loading surface 16 in the direction of the longitudinal axis L of the transport cart 10 and falling off the transport cart 10.

In an, in relation to the longitudinal axis L of the transport cart 10, central region of the base element 12 a handle 22 is removably attached to the base element 12. The handle 22 is of an integral construction and comprises a first strut 24, which extends from a first lateral surface 26 of the base element 12, as well as a second strut 28, which extends from a second, opposite lateral surface 30 of the base element 12 to the first lateral surface 26 of the base element 12. The first and the second strut 24, 28 are aligned substantially parallel to one another and at an angle of ca. 55° relative to the loading surface 16 of the base element 12. A substantially U-shaped connection element 32 is connected to the free ends of the first and second struts 24, 28 that extend from the lateral surfaces 26, 30 of the base element 12. At the connection element 32 the handle 22 may be comfortably gripped by a user and the transport cart 10 may therefore be comfortably pulled or pushed.

The handle 22 of the transport cart 10 is so shaped and attached in such a position to the base element 12 that the base element 12 of the transport cart 10, in the unloaded state of the transport cart 10, may be stacked onto a base element 12 of a further, for example identically designed transport cart 10. In other words, the handle 22 of the transport cart 10 is so shaped and attached in such a position to the base part 12 that it does not impede the depositing of the base element 12 of the transport cart 10 on the base element 12 of the further transport cart 10. What is more, the wheels 18 that are fastened to the bottom surface 14 of the base element 12 at a distance from the longitudinal edges of the base element 12 may easily be deposited on the loading surface 16 of the base part 12 of an identical transport cart 10. The transport cart 10, when not in use, may therefore be stored in a space-saving manner.

Figure 2:
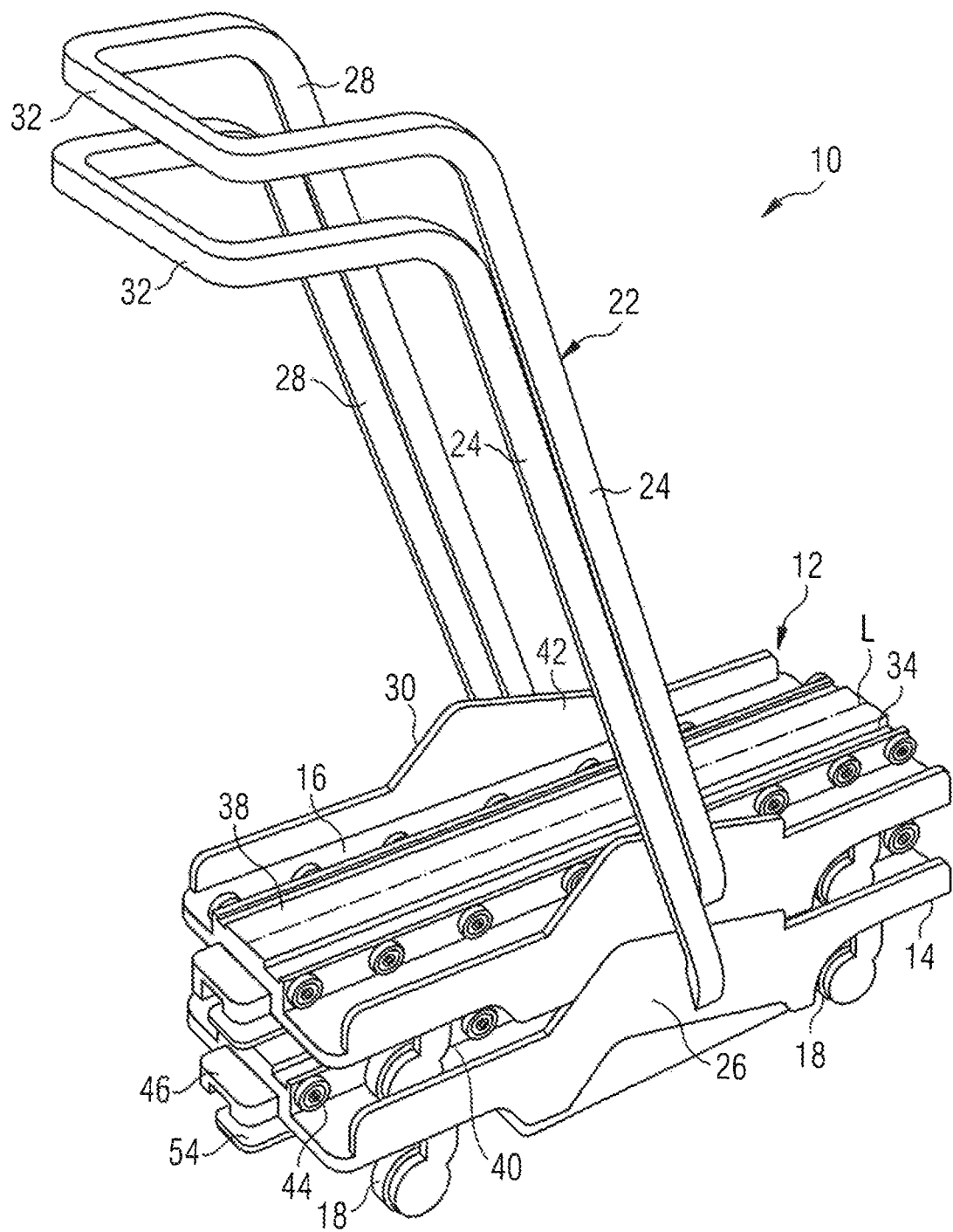
FIG. 2 shows a second three-dimensional view of the transport cart according to FIG. 1.

As may best be seen in FIGS. 1 and 2, the loading surface 16 of the base element 12 has a raised step 34. On a surface 36 of the step 34 a first guide device 38 is disposed. The first guide device 38 comprises a projection that is devised to come into engagement with a groove of a second guide device that is complementary to the first guide device 38 and is formed on the box 20, which may be accommodated in the aircraft galley to be equipped and is provided for transport in the transport cart 10. The first guide device 38 of the transport cart 10 and the complementary second guide device formed on the box 20 therefore form a tongue-and-groove joint. In interaction with the complementary second guide device formed on the box 20 the first guide device 38 prevents the box 20 that is being transported on the transport cart 10 from being unintentionally displaced on the transport cart 10 in a direction at right angles to the longitudinal axis L of the transport cart 10, for example when the transport cart 10 is travelling on uneven ground.

The loading surface 16 of the base element 12 and/or the surface 36 of the raised step 34 formed in the region of the loading surface 16 is disposed at a height that corresponds to the height of a bottom panel of a compartment of the aircraft galley that is disposed in a lower portion of the aircraft galley that is to be equipped with the box 20. A plurality of rollers 44 are moreover fastened to lateral surfaces 40, 42 of the step 34 formed in the region of the loading surface 16 of the base element 12. With the aid of the rollers 44 the box 20 may easily be pushed off the transport cart 10 into the compartment of the aircraft galley that is provided for receiving the box 20. In a similar manner the rollers 44 facilitate the removal of a box 20 from the compartment of the aircraft galley, because the box 20 may be comfortably pulled out of the compartment onto the loading surface 16 of the base element 12.

The total width of the transport cart 10 is so selected that it is smaller than the width of an aisle of an aircraft, in which the aircraft galley to be equipped with the aid of the transport cart 10 is disposed. The transport cart 10 may therefore be pushed easily and comfortably along the aisle of the aircraft to the aircraft galley that is to be equipped. The base element 12 is however wide enough to enable safe and comfortable transport of the box 20.

Figure 5:
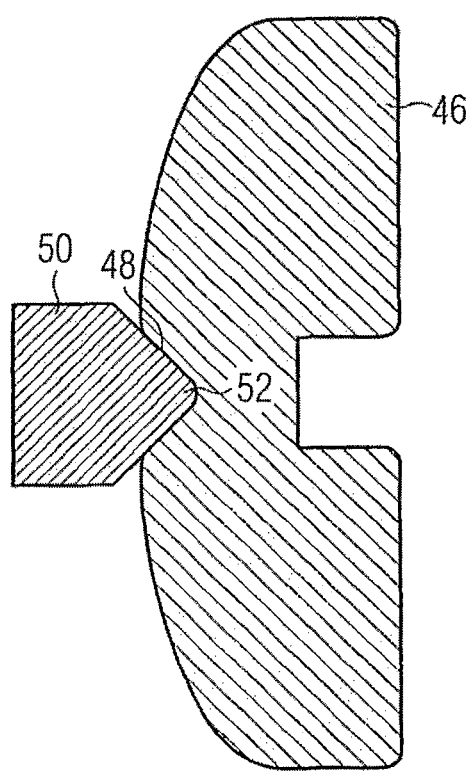
FIG. 5 shows a detail representation of a positioning device of the transport cart that interacts with a complementary positioning device provided at an aircraft galley that is to be equipped.

In order to facilitate the positioning of the transport cart 10 relative to the aircraft galley that is to be equipped, a positioning device 46 that is represented to an enlarged scale in FIG. 5 is provided on the transport cart 10. The positioning device 46 is fastened to the base element 12 and provided with a recess 48. Once the transport cart 10 has reached a desired position relative to the aircraft galley that is to be equipped, the positioning device 46 of the transport cart 10 interacts with a complementary positioning device 50, which is provided at the aircraft galley to be equipped and is likewise represented in FIG. 5 in order to illustrate the mode of operation of the positioning device 46. In particular, a projection 52 provided on the positioning device 50 of the aircraft galley interacts with the recess 48 of the positioning device 46 of the transport cart 10.

The aircraft galley may for example be subdivided in vertical direction into a plurality of portions, with each of which a positioning device 50 may be associated for interacting with the positioning device 46 of the transport cart 10. The transport cart 10 may then be positioned in each case in front of these portions in such a way that boxes 20 may be comfortably pushed off the transport cart 10 into the aircraft galley. In a similar manner, boxes 20 from the aircraft galley may be comfortably received on the loading surface 16 of the base element 12.

Particularly comfortable operation of the transport cart 10 is enabled when a blocking device, which is not represented in detail in the figures, for blocking the wheels 18 of the transport cart 10 comprises a plurality of actuating devices 54. The actuating devices 54 are disposed in the region of the first end and in the region of the second end of the transport cart 10, so that the blocking device for blocking the wheels 18 may be actuated from various sides of the transport cart 10.

The invention claimed is:

1. An equipping system for equipping an aircraft galley comprising:
   a box, which is accommodatable in the aircraft galley to be equipped, and
   a transport cart for equipping the aircraft galley, the transport cart comprising
      a base element having a substantially plate-shaped configuration defining
         a bottom surface,
         a loading surface opposite of the bottom surface,
         a first lateral surface extending along a first side of the base element, the first lateral surface defining a first protrusion extending upwardly away from an upper portion thereof and a first recess on a lower portion thereof positioned beneath the first protrusion, and
         a second lateral surface extending along a second side of the base element opposite the first side, the second lateral surface defining a second protrusion extending upwardly away from an upper portion thereof and a second recess on a lower portion thereof positioned beneath the second protrusion,
      a plurality of wheels fastened to and extending downwardly from the bottom surface of the base element, and
      a handle comprising
         a first strut secured to the first lateral surface,
         a second strut secured to the second lateral surface, each of the first and second struts secured to the first and second lateral surfaces at respective end portions thereof, each of the first and second struts extending upwardly toward a rear of the transport cart from the respective lateral surface at an angle relative to the loading surface of the base element, and
         a connection element connecting the first and second struts, wherein the handle is of integral construction such that the first strut, the second strut and the connection element are not movable relative to each other,
   wherein the first and second struts are spaced laterally apart from the respective first and second lateral surfaces except at the respective end portions thereof, and wherein the handle is shaped and attached in such a position to the base element such that a second base element of an identical, second transport cart is stackable onto the loading surface of the base element of the transport cart arranged substantially parallel to the base element of the transport cart and disposed between the first and second struts of the transport cart, in the unloaded state of the transport cart, and wherein the first and second protrusions of the base element of the transport cart engage the first and second recesses respectively of the second base element of the second transport cart when the second base element is stacked onto the loading surface of the base element of the transport cart.

2. An equipping system according to claim 1, further comprising a securing mechanism adapted to prevent the box from sliding off the transport cart while it is being transported on the transport cart.

3. An equipping system according to claim 2, wherein at least one of the first and the second strut of the handle is fastened, in relation to a longitudinal axis of the transport cart, in a central region of the base element to the base element.

4. An equipping system according to claim 1, wherein the angle between the first and the second struts of the handle and the loading surface of the base element is ca. 35° to ca. 80°, and the first and the second struts of the handle are fastened, in relation to a longitudinal axis of the transport cart, in a central region of the base element to the first and second lateral surfaces respectively.

5. An equipping system according to claim 1, wherein the connection element of the handle comprises a substantially U-shaped connection element, which is connected to the free ends of the first and second struts that extend from the lateral surfaces of the base element, and wherein the U-shaped connection element lies in a first plane that is angled from a second plane defined by the first and second struts.

6. An equipping system according to claim 1, wherein the handle is at least one of removably attached to the base element and pivotably attached to the base element.

7. An equipping system according to claim 1, wherein the base element in the region of the loading surface is provided with a first guide device that is adapted to come into engagement with a complementary second guide device formed on the box and that is further adapted, when it is situated in engagement with the complementary second guide device formed on the box, to secure the box, while it is being transported on the transport cart, against displacement on the transport cart in a direction at right angles to a longitudinal axis of the transport cart.

8. An equipping system according to claim 7, wherein the first guide device and the complementary second guide device formed on the box form a tongue-and-groove joint.

9. An equipping system according to claim 7, wherein at least one of the loading surface of the base element and the first guide device is disposed in a position on the transport cart that is adapted in such a way to a position of an arrangement in the aircraft galley for receiving the box provided for transport on the transport cart that the box accommodated on the transport cart may be loaded from the transport cart into the aircraft galley substantially by virtue of a horizontal displacement.

10. An equipping system according to claim 7, wherein the loading surface of the base element has a raised step, on the surface of which the first guide device is disposed.

11. An equipping system according to claim 10, further comprising a plurality of rollers disposed in the region of the loading surface of the base element.

12. An equipping system according to claim 11, wherein the rollers are fastened rotatably to lateral surfaces of the step formed in the region of the loading surface of the base element.

13. An equipping system according to claim 1, further comprising a blocking device for blocking the wheels, the blocking device comprising a plurality of actuating devices.

14. An equipping system according to claim 1, further comprising a positioning device that is adapted to interact with a complementary positioning device, which is provided at the aircraft galley to be equipped, in order to position the transport cart relative to the aircraft galley to be equipped.

15. An equipping system according to claim 14, wherein at least one of the positioning device of the transport cart is fastened to the base element and the positioning device of the transport cart is provided with a recess that is adapted, once the transport cart has reached a desired position relative to the aircraft galley to be equipped, to receive a projection of the complementary positioning device provided at the aircraft galley to be equipped.

16. An equipping system according to claim 1, wherein the base element has a rectangular shape having an outer periphery defining the first side, the second side, a first end extending from the first side to the second side, and a second end extending from the first side to the second side.

17. An equipping system according to claim 16, wherein each of the first and second struts is secured to a central region of the respective lateral surface spaced between the first and second ends.

18. An equipping system for equipping an aircraft galley, the equipping system comprising:
a box, which is accommodatable in the aircraft galley to be equipped, and
a transport cart for equipping the aircraft galley, the transport cart comprising
a base element having a substantially plate-shaped configuration defining
a bottom surface,
a loading surface opposite of the bottom surface,
a first lateral surface extending along a first side of the base element parallel to a longitudinal axis of the transport cart, the first lateral surface defining a first protrusion extending upwardly away from an upper portion thereof and a first recess on a lower portion thereof positioned beneath the first protrusion, the first protrusion defining a first upwardly extending slope on a forward side thereof and a second downwardly extending slope on a rear side thereof, the first slope defining a first angle relative to the loading surface, and the second slope defining a second angle relative to the loading surface, the first angle less than the second angle, and
a second lateral surface extending along a second side of the base element opposite the first side and parallel to the longitudinal axis of the transport cart, the second lateral surface defining a second protrusion extending upwardly away from an upper portion thereof and a second recess on a lower portion thereof positioned beneath the second protrusion, the second protrusion defining a third upwardly extending slope on a forward side thereof and a fourth downwardly extending slope on a rear side thereof, the third slope defining a third angle relative to the loading surface, and the fourth slope defining a fourth angle relative to the loading surface, the third angle less than the fourth angle,
a plurality of wheels fastened to and extending downwardly from the bottom surface of the base element, the wheels fastened to the bottom surface of the base element at a distance from longitudinal edges of the base element, and
a handle comprising
a first strut secured to the first lateral surface,
a second strut secured to the second lateral surface, each of the first and second struts secured to the first and second lateral surfaces at respective end portions thereof, each of the first and second struts extending upwardly toward a rear of the transport cart from the respective lateral surface at an angle relative to the loading surface of the base element, and
a connection element connecting the first and second struts, wherein the first strut, the second strut and the connection element are not movable relative to each other, wherein the first and second struts are spaced laterally apart from the respective first and second lateral surfaces except at the respective end portions thereof, wherein the handle is attached in a central portion of the base element, and wherein a second base element of an identical, second transport cart is stackable onto the loading surface of the base element of the transport cart such that the second base element of the second transport cart is arranged substantially parallel to the base element of the transport cart and disposed between the first and second struts of the transport cart, in the unloaded state of the transport cart, and wherein the first and second protrusions of the base element of the transport cart are configured to engage the first and second recesses respectively of the second base element of the second transport cart when the second base element is stacked onto the loading surface of the base element of the transport cart.

\* \* \* \* \*